United States Patent [19]

Pinkus

[11] Patent Number: 5,070,239

[45] Date of Patent: Dec. 3, 1991

[54] NIGHT VISION GOGGLE AMBIENT ILLUMINATION TESTING

[75] Inventor: Alan R. Pinkus, Oxford, Ohio

[73] Assignee: The United States of America as represented by the Secretary of the Air Force, Washington, D.C.

[21] Appl. No.: 608,932

[22] Filed: Nov. 5, 1990

[51] Int. Cl.⁵ .......................... G01J 1/42; G01D 18/00
[52] U.S. Cl. .............................. 250/252.1; 250/504 R
[58] Field of Search ................ 250/252.1 A, 330, 332, 250/331, 493.1, 504 R, 504 H; 358/113

[56] References Cited

U.S. PATENT DOCUMENTS

| | | | |
|---|---|---|---|
| 4,000,419 | 12/1976 | Crost et al. | 250/213 |
| 4,128,340 | 12/1978 | Fender et al. | 250/252.1 X |
| 4,145,142 | 3/1979 | Mikeman | 250/252.1 X |
| 4,309,608 | 1/1982 | Adamson, Jr. et al. | 250/330 |
| 4,328,516 | 5/1982 | Colpack et al. | 358/113 |
| 4,407,009 | 9/1983 | Adamson et al. | 358/113 |
| 4,574,197 | 3/1986 | Kliever | 250/334 |
| 4,707,595 | 11/1987 | Meyers | 250/504 R |
| 4,843,229 | 6/1990 | Reed et al. | 250/213 VT |
| 4,948,964 | 8/1990 | Gohlke | 250/252.1 X |

OTHER PUBLICATIONS

Anv-120 System Gain Test Set for Gen II and Gen III Night Vision Devices Rev. 1-27-89.

Primary Examiner—Constantine Hannaher
Assistant Examiner—Edward J. Glick
Attorney, Agent, or Firm—Gerald B. Hollings; Donald J. Singer

[57] ABSTRACT

A night vision goggle capability evaluation apparatus useful in assessing the degree of illumination present in a proposed NVG operating environment is disclosed. The evaluation apparatus includes portable illuminator and detector devices that are battery operated and optionally coupled to the input and output ports of the goggle during both their own calibration and during measurement of the proposed operating environment. The disclosed apparatus operates by calibrating the NVG output measuring detector from the saturated and dark output extremes of the NVG system and then using this calibrated detector to measure the output of the NVG system and determine whether is it receiving adequate light for satisfactory performance.

8 Claims, 1 Drawing Sheet

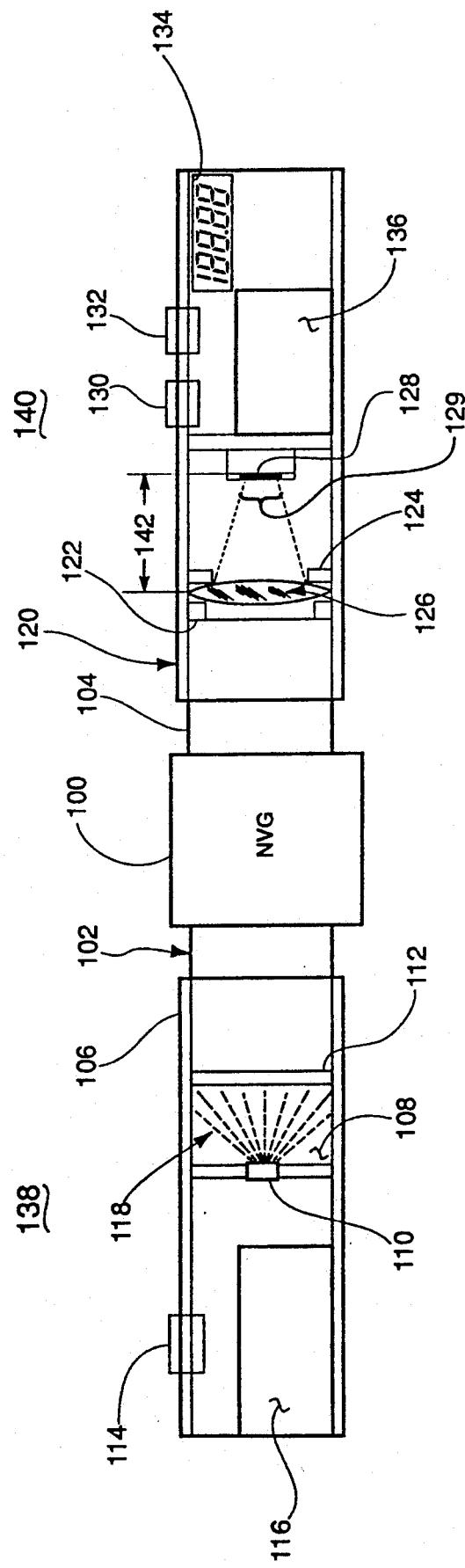

NIGHT VISION GOGGLE AMBIENT ILLUMINATION TESTING

RIGHTS OF THE INVENTION

The invention described herein may be manufactured and used by or for the Government of the United States for all governmental purposes without the payment of any royalty.

BACKGROUND OF THE INVENTION

This invention relates to the field of image intensifiers or night vision goggle systems and to the testing apparatus used with such equipment.

Although night vision goggle (NVG) apparatus has become an essential military tool for both airborne and surface operations, the use of this equipment has become recognized as a major benefit which is also attended by a degree of hazard and difficulty. In particular, published news accounts suggest that the combination of limited NVG field of view and wide range of ambient illumination which may exist during nighttime operations have contributed to a number of equipment and personnel jeopardy situations which are desirably avoided in similar future operation.

In avoiding NVG related hazards it has become accepted practice for the decision regarding embarkation on a military night vision mission to be placed in the hands of more experienced personnel and for this decision to be based on such criteria as moon illumination charts which predict the moon sourced light to be expected at a given hour of a selected night. Additionally, a moon meter apparatus and a subjective evaluation of the ambient illumination existing proximate the time of missions activity may be used in making these decisions.

In practice, however, all of these night illumination evaluations are found to be somewhat lacking in precision and objectivity since, for example, weather conditions are often more significant than the data from a moon illumination chart and the result of a moon meter measurement does not account for degraded night vision goggle performance or the unique reflectivity characteristics of a particular terrain.

It appears therefore that notwithstanding these previously practiced techniques, there is need in the art for a more objective night vision goggle performance indication. This needed indication will enable military safety officers and persons such as aircrew members to determine with a greater degree of certainty that the illumination available in a given target situation is sufficient for reliable use of night vision goggle equipment and moreover will provide this determination with the relative ease and certainty needed in a military environment.

The patent art includes several examples of night vision goggle systems and apparatus usable with these systems for a variety of purposes. Included in this patent art is U.S. Pat. No. 4,309,608 issued to J. R. Adamson Jr. et al which is concerned with a go-no-go tester usable under flight line conditions for the evaluation of an image intensifier goggle system. The Adamson et al patent teaches the use of a light emitting diode infrared source that is battery energized to provide a low-level light image test signal for an image intensifier goggle. The Adamson tester is principally intended for use under flight line operating conditions in order to assure the sensitivity of an image intensifier goggle system immediately prior to its use. It is significant to note, however, that the Adamson testing arrangement depends upon the user's eye for measuring the goggle output signal—that is, it depends upon the user being able to discern a low contrast pattern to determine the direction of pattern orientation—as is described at column 7, lines 25-30 of the specification. Such arrangement contrasts with the more objective measurement provided by the present invention.

Also included in this art is the patent of M.J. Colpack et al, U.S. Pat. No. 4,328,516, which is concerned with providing a test signal input for the electronics portion of a forward looking infrared system. The Colpack et al invention provides a signal source which can replace the infrared operated portions of the system with an artificial test signal in order that complexities of the infrared system, including cryogenic cooling, can be avoided. Since the object of the Colpack et al invention is to produce a test image which is reproduced on a cathode ray tube system, clear distinctions between the Colpack et al patent and the present invention are readily apparent.

This patent art also includes the less relevant viewing and measuring system for remote thermal energy sources of T.R. Whitney, U.S. Pat. No. 3,730,985; the modification of a night vision thermal image system to enable television camera viewing of the output image as disclosed in the U.S. Pat. No. 4,407,009 of J.R. Adamson Jr. et al; and the apparatus for adding electronic display information to a night vision goggle output image as disclosed in the U.S. Pat. No. 4,000,419 of M.E. Crost et al.

In addition to these teachings in the patent art an apparatus manufactured by Hoffman Engineering Corporation of Stanford Connecticut and known as "The ANV-120 System Gain Test Set for Generation II and III Night Vision Devices" is of interest with respect to the present invention. A document dated May, 1989 and revised on Jan. 27, 1989 and describing the ANV 120 test step is included in the file history of the present. The Hoffman apparatus is dependent upon an incandescent light source, is not portable in nature, and has other distinguishing features with respect to the present invention.

The above identified references indicate the presence of significant effort in the field of night vision goggle apparatus and its testing, however, none of these references achieves the advantages of the simple two-piece environment evaluation apparatus of the present invention.

SUMMARY OF THE INVENTION

The present invention provides an NVG optical output signal measuring apparatus which uses a provided NVG light source along with the NVG itself to accomplish measurement of the NVG system optical output signal under proposed operating environment conditions. The NVG light output measurement is related to the amount of light received at the NVG input in order that an objective evaluation of the input light for satisfactory NVG system operation be possible.

It is therefore an object of the present invention to provide an apparatus for evaluating the adequacy of ambient illumination for NVG satisfactory use.

It is another object of the invention to provide for calibration of the NVG output measuring apparatus prior to its use in measuring the NVG system output signal.

It is another object of the invention to provide a portable NVG output and input signal evaluation apparatus that can be easily transported with the NVG system.

It is another object of the invention to provide an NVG evaluating apparatus in which one portion serves in both a calibrating and light evaluating role.

It is another object of the invention to provide an NVG output light measuring system which is portable and self-contained in nature.

Additional objects and features of the invention will be understood from the following description and claims and the accompanying drawings.

These and other objects of the invention are achieved by a portable night vision goggle ambient light operating environment evaluation apparatus comprising the combination of; a fixed spectrum variable intensity light source assembly mounted within a portable container receivable in light sealed relationship with one light input aperture of a night vision goggle under test, the light source assembly including an infrared spectrum inclusive light emitting diode, means for controlling the energy output intensity of the light emitting diode, means for diffusing the energy output of the light emitting diode, and first battery means for energizing the light emitting diode, light output measuring apparatus mounted within a portable container receivable in light sealed relationship with the corresponding light output port of the night vision goggle under test, the light output measuring apparatus including a visible spectrum optical energy to electrical energy transducer element, means for refracting the optical image output of the light output port onto an optical energy reception surface of the transducer element, electrical signal measuring means for indicating the magnitude of the transducer electrical signal output means, for calibrating the maximum and minimum optical signal responses of the signal measuring means, and second battery means for energizing the electrical signal measuring means; and means for correlating a natural scene measurement by the measuring apparatus electrical measuring means, after calibration of the maximum and minimum optical signal responses thereof with predetermined subjective satisfactory goggle ambient illumination criteria.

BRIEF DESCRIPTION OF THE DRAWING

The drawing shows one element of a night vision goggle system coupled with input and output signal apparatus according to the invention.

DETAILED DESCRIPTION

The drawing shows one-half or one eye's portion of a night vision goggle pair 100 that is optically coupled to an artificial signal input source 138 and an output signal measuring apparatus 140. In the interest of language simplicity, the one-half of a NVG pair 100 is referred to herein simply as an NVG or an NVG system in preference to repeated recognitions that two such half-systems one for each of the operator's eyes, are used in a complete NVG assembly. In the drawing the NVG objective port or input aperture is shown at 102 and the eyepiece or output port at 104. The artificial signal input source 138 is coupled to the NVG objective port or input aperture 102 by way of a light-tight but easily disconnected slip fitting between the housing tube 106 and the input aperture 102.

Within the housing tube 106 of the NVG 100 is disposed a source of infrared illumination such as the infrared light emitting diode 110. This diode serves as a source of illumination that is colorwise located within the spectral response of the NVG 100. The light emitting diode 110, in fact, preferably has a output which includes the region of 750 nanometers and may also provide output energy in the nearby spectral frequency bands. The light emitting diode 110 is preferably of the wide angle variety which is capable of spreading its output energy over the full diameter of the output housing tube 106 within a short axial distance—as is indicated at 118 in the drawing.

In addition to the wide angle output from the LED 110, the drawing apparatus is provided with a translucent diffuser member 112 which may be fabricated from translucent (but preferably not transparent) plastic material or ground glass or similar materials and which serves to further make uniform the illumination received across the surface of the NVG input aperture 102. Additional dispersion of the light emitting diode output energy toward the desired uniformity is provided by a diffusion coating disposed over the interior surface of the housing tube 106 as is indicated at 108 in FIG. 1. The coating 108 may be made of a white colored finely divided oxide powder or may be fabricated in the form of a chemical coating such as flat white paint applied to the housing tube interior in the LED output region.

Also included in the artificial input source 138 is an energy source which is preferably in the form of an electrical battery and from which the light emitting diode 110 is energized. In connection with such energization, an infrared energy output control as indicated generally at 114 in FIG. 1 is also provided. The combination of the battery 116 and the variable control 114, a variable resistance, for example, provides a controllable level of infrared optical output energy from the light emitting diode 110. Thereby the diode 110 may be used to provide optical input signal varying between zero or darkness in its off or unenergized condition and saturation intensity for the NVG input aperture 102.

The housing tube 120 of the output signal measuring apparatus 140 is similarly disposed in a light-tight manner over the eyepiece or output port 104 of the NVG 100. Included within the housing tube 120 is an optical energy to electrical energy transducer member such as the photodiode 128 which is indicated at 120 in the drawing.

The photodiode 128 preferably has a spectral response which encompasses the frequency or color of 550 nanometers, a color of green which is within the visible spectrum for the human eye. The 550 nanometer spectral region is a large component in the output of most NVG systems.

Optical energy originating in the NVG 100 and emanating from the eyepiece 104 is collected by the optical lens member 126 which is also disposed in the housing tube 120. The lens 126 is held in desired predetermined position by the pair of annular lens mounting members 122 and 124. The member 122 of this pair also serves as an eyepiece stop for the NVG output port 104 in the housing tube 120. Preferably the photodiode 128 and the lens 126 are separated by an axial distance of substantially one lens focal length as indicated at 142 in order that the optical energy from the NVG output port 104 be collimated onto the traducing surface 129 of the photodiode 128.

Electrical signals from the photodiode 128 are applied either directly or through an electronic amplifier which is not shown in the drawing to an amplitude measuring and display apparatus of the digital type which is indicated at 134 in FIG. 1. Included in the measuring and display apparatus 134 or alternately in the electronic amplifier are the two calibration controls 130 and 132 which adjust the output of the measuring and display apparatus 134 to indicated zero and one hundred percent under conditions of low light output and maximum light output from the NVG output port 104. Also shown within the housing tube 120 is a second energy source in the form of an electrical battery 136; the battery 136 serving to energize the optional electronic amplifier if used and the amplitude measuring and display apparatus 134 in order that the measurement function and the displaying of the numerals indicated at 132 be accomplished.

The NVG output measurement apparatus 140 may be referred to conveniently as a detector and is used for two distinguishable functions in the present invention. In the first of these functions the detector 140 cooperates with the artificial signal input source or illuminator 138 in order to "record" the maximum and minimum light signal generated by the NVG. This recording is accomplished with the zero and one hundred percent adjustments 130 and 132. These adjustments in essence remember the NVG output signal which results from saturation of the NVG input, and the NVG output indication when the illuminator 138 is switched off. In this first function the output indication on the display apparatus 134 is adjusted to read 100 Percent and zero percent under NVG input saturation and NVG on but illuminator off conditions respectively at the detector input lens 126. During the zero percent adjustment the illuminator 138 keeps external light out of the detector 140. However, low level residual noise output may be present in the detector 140 and can appear as a small light signal to be zeroed out. Since the noise signal may actually be below the detector measurement threshold, the detector on or off condition during the zero Percent adjustment can actually be of little consequence. In essence therefore, this first function of the detector 140 achieves its calibration to the NVG system that is proposed for use.

In the second function of the output signal measuring apparatus or detector 140, the NVG input aperture 102 is aimed at the scene being evaluated for NVG aided operations and the light output of the NVG at the output port 104 measured in order to determine the scene illumination adequacy for satisfactory NVG use. In this second function, therefore, the calibrated detector 140 is used to measure the output to the NVG under the proposed conditions of NVG employment.

In the Preferred arrangement of the invention during the first function of the detector 140 the artificial signal input source or illuminator 138 is adjusted to the Point of driving the NVG system past a knee of the saturation curve in an exercise of the auto gain feature of the NVG. For operation, therefore, the illuminator and detector sections 138 and 140 are first attached to the NVG objective and eyepiece at 102 and 104 respectively. With the NVG in the "ON" condition the infrared illuminator 110 is energized to saturate the entire field of the NVG. The maximum output indicating calibration adjustment 132 is adjusted until the numeric liquid crystal display (LCD) 134 shows a reading of 100.00. The zero adjustment 130 is then manipulated in the above described zero Percent sequence until the LCD 134 reads 0.00. The illuminator 138 is then removed from the NVG system. The NVG objective 102 is then aimed at several night illuminated scenes, and readings on the liquid crystal display 134 obtained. These readings are the NVG weighted response to the night ambient illumination. Numerical values above a predetermined level indicate that there is sufficient increased or decrease of night illumination, the type of equipment to be involved in the night operation and other judgmental Once a reading is obtained from the liquid crystal display 134 of the detector 140 the magnitude of this reading may be compared with a table of predetermined numerical values to determine whether the contemplated night vision mission should be undertaken. A table of such values may be provided in numerical or graphical form and Preferably includes indication of at least a safe operating range, a doubtful operating range, and an unsafe range of illumination values. Illumination readings falling in the doubtful range are Preferably resolved on the basis of judgment, including consideration of the type of mission to be performed and such subjective considerations as the expected increase or decrease of night illumination, the type of equipment to be involved in the night operation and other judgmental factors. A table of the type described could also be disposed on the exterior surface of the housing tubes 106 and 120 or provided in the form of a Portable chart or a computer look-up table.

The described NVG system apparatus therefore provides additional guidance to NVG operators, especially operators new to the NVG system, and allows combat or rescue groups to establish minimum ambient illumination requirements for the conduct of specific missions. The Present testing apparatus is, however, preferably used in conjunction with other methods as an aid in the determination of safety of available light for the conduct of a mission.

In an alternate arrangement of the invention, the illuminator 138 could be constructed as a calibrated source capable of communicating a Precisely known amount of infrared energy into the NVG input Port. Similarly the detector 140 may be arranged to readout absolute units such as "nits". Such calibration of the illuminator and detector portions of the drawing illustrated system enables the absolute electro optical performance of the NVG system with respect to its design criteria and rated performance.

While the apparatus and method herein described constitute a preferred embodiment of the invention, it is to be understood that the invention is not limited to this Precise form of apparatus or method and that changes may be made therein without departing from the scope of the invention which is defined in the appended claims.

I claim:

1. Portable night vision goggle ambient light illumination apparatus comprising the combination of:
   a fixed spectrum variable intensity light source assembly mounted within a portable container that is receivable in light sealed relationship with an input aperture of a night vision goggle under test;
   said light source assembly including an infrared spectrum inclusive light emitting diode, means for controlling the level of energy output from said light emitted diode, means for diffusing the energy output of said light emitting diode, and first battery means for energizing said light emitting diode;

light output measuring apparatus mounted within a portable container receivable in light sealed relationship with the corresponding light output port of said night vision goggle under test;

said light output measuring apparatus including a visible spectrum optical energy to electrical energy transducer element, means for refracting the optical image output of said light outport port onto an optical energy reception surface of said transducer element, electrical signal measuring means for indicating the magnitude of said transducer electrical signal output, adjustment means for calibrating the maximum and minimum optical signal responses of said signal measuring means, and second battery means for energizing said electrical signal measuring means; and means for correlating a natural scene generated measurement by the combination of said night vision goggle with said light output measuring apparatus received thereon, after calibration of said maximum and minimum optical signal responses of said light output measuring apparatus, with predetermined objective minimal ambient illumination criteria for satisfactory goggle operation.

2. The apparatus of claim 1 wherein said light source assembly means for diffusing the energy output of said light emitting diode includes both a translucent transmission element optically coupled with said light emitted diode and a diffusing coating on the surfaces surrounding said light emitting diode element.

3. The apparatus of claim 1 wherein said light emitting diode has substantial optical energy output in the spectral range of seven hundred fifty nanometers of wavelength.

4. The apparatus of claim 1 wherein said adjustment means for calibrating said signal measuring means includes means for generating a predetermined measuring output indication in response to a dark signal input at said goggle light input aperture.

5. The apparatus of claim 1 wherein said light output measuring apparatus includes means for adjusting the output signal indication of said signal measuring means to a predetermined output signal magnitude in the presence of goggle optical output signal just above the saturation knee of an optical output level versus optical input level goggle gain curve.

6. The apparatus of claim 1 wherein said means for refracting said light output port optical image output includes a convex optical lens member.

7. The apparatus of claim 1 wherein said means for indicating the magnitude of said transducer electrical signal output comprises a liquid crystal digital display.

8. The method for evaluating the viability of a night vision goggle for use in a selected scene environment comprising the steps of:

calibrating a goggle output signal measuring apparatus to both the dark input and saturated bright input elicited eyepiece output signal of said goggle, said calibrating including conforming zero and one hundred percent output indications by said measuring apparatus with said dark and saturated bright input signals thereto from said goggle;

measuring the optical output response of said goggle to said selected scene environment using said calibrated goggle output measuring apparatus; and comparing said measured response value with predetermined criteria of acceptable and unacceptable goggle output signal level responses.

* * * * *

UNITED STATES PATENT AND TRADEMARK OFFICE
CERTIFICATE OF CORRECTION

PATENT NO. : 5,070,239

DATED : December 3, 1991

INVENTOR(S) : Alan R. Pinkus

Page 1 of 2

It is certified that error appears in the above-identified patent and that said Letters Patent is hereby corrected as shown below:

```
Col 1, line 25, "operation" should read --operations--.
Col 2, line 39, "ANV 120" should read --ANV-120--.
Col 2, line 40, --patent document-- should follow "present".

Col 5, line 30, "Percent" should be decapitalized.
Col 5, line 33, a comma should follow "adjustment".
Col 5, line 35, "140.  However" should read --140, however--.
Col 5, line 36, --output-- should follow "small".
Col 5, line 39, "Percent" should be decapitalized.
Col 5, line 51, the second occurrence of "to" should read
      --of--.
Col 5, line 53, "Preferred' should be decapitalized.
Col 5, line 54, a comma should follow "140".
Col 5, line 55, "Point" should be decapitalized.
Col 5, line 57, a hyphen should follow "curve".
Col 5, line 67, "Percent" should be decapitalized.
Col 6, lines 6-9, replace the text from "increased" to
      "judgmental" with --illumination for the safe conduc-
      tion of a nighttime NVG augmented mission -- a mission
      such as combat, rescue, aerial refueling, search and
      rescue, or training.--
```

UNITED STATES PATENT AND TRADEMARK OFFICE
CERTIFICATE OF CORRECTION

PATENT NO. : 5,070,239

DATED : December 3, 1991

INVENTOR(S) : Alan R. Pinkus

It is certified that error appears in the above-identified patent and that said Letters Patent is hereby corrected as shown below:

Col 6, line 16, "Preferably" should be decapitalized.
Col 6, line 19, "Preferably" should be decapitalized.
Col 6, line 27, "Portable" should be decapitalized.
Col 6, line 34, "Present" should be decapitalized.
Col 6, line 40, "Precisely" should be decapitalized.
Col 6, line 41, "Port" should be decapitalized.
Col 6, line 51, "Precise" should be decapitalized.

Signed and Sealed this

Thirteenth Day of April, 1993

*Attest:*

STEPHEN G. KUNIN

*Attesting Officer*    *Acting Commissioner of Patents and Trademarks*